R. H. McCARTNEY.
CAMERA SHUTTER CONTROL.
APPLICATION FILED JULY 13, 1915.
1,185,337.
Patented May 30, 1916.
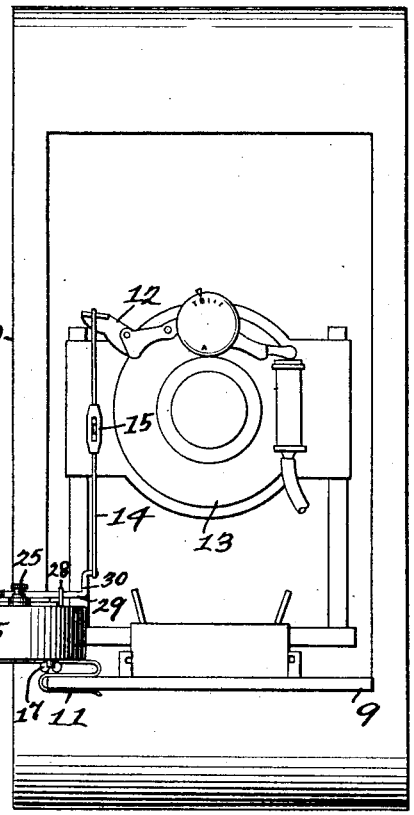
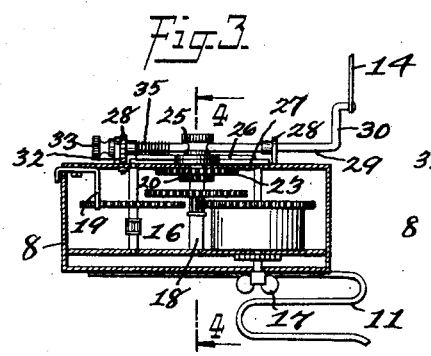
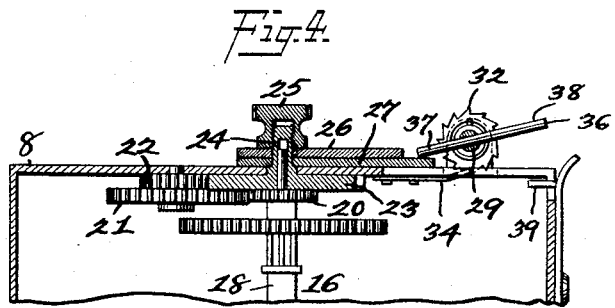
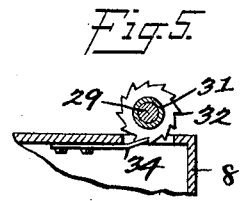
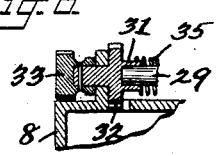
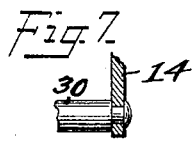
WITNESSES
George L. Blume.
J. E. Larsen
INVENTOR
R. H. McCartney
BY
ATTORNEYS
THE COLUMBIA PLANOGRAPH CO., WASHINGTON, D. C.

UNITED STATES PATENT OFFICE.

ROBERT H. McCARTNEY, OF ISHPEMING, MICHIGAN.

CAMERA-SHUTTER CONTROL.

1,185,337.  Specification of Letters Patent.  Patented May 30, 1916.

Application filed July 13, 1915.  Serial No. 39,606.

*To all whom it may concern:*

Be it known that I, ROBERT H. MCCARTNEY, a citizen of the United States, and a resident of Ishpeming, in the county of Marquette and State of Michigan, have invented certain new and useful Improvements in Camera-Shutter Controls, of which the following is a specification.

My invention relates to means for automatically actuating the shutter of a camera, to open the same at the expiration of a predetermined period of time from the time of setting the device, and to close the same after another predetermined period of time, thus giving the operator an opportunity to get into the field of the camera, and making the desired exposure, according to conditions, such as light value, subject, etc.

A further object is to provide a small and compact device for this purpose which is readily slipped on and off a camera, and constitutes a distinct article of manufacture independent of the camera or shutter, although it may be connected with the camera permanently if desired.

My invention is fully described in the following specification, of which the accompanying drawings form a part, in which like characters refer to like parts in each of the views, and in which:—

Figure 1 is a face view of my invention; Fig. 2 is a view thereof as applied to a folding pocket camera, in operative position; Fig. 3 is a section taken on the line 3—3 of Fig. 1; Fig. 4 is an enlarged fragmentary section taken on the line 4—4 of Fig. 3; Fig. 5 is a sectional detail of a ratchet and pawl which I employ; Fig. 6 is a sectional detail of the winding end of the trip rod; and Fig. 7 is a fragmentary sectional view of the crank and shutter link connection.

In the drawings forming a part of this application I have shown a casing 8 adapted for attachment to the front plate 9 of a camera 10 by means of a spring clamp 11 and in operative connection with the release lever 12 of the shutter 13 of said camera by means of a link 14 preferably adjustable as to length by a turn-buckle 15. The casing 8 contains a clock mechanism 16 adapted to be wound by a key 17, said mechanism being of any desired form but including a staff 18 having a retarding train of gears in operative connection therewith and with a lock 19, Fig. 3. The staff 18 is provided with a fixed pinion 20 enmeshed with a gear 21 carrying a pinion 22 enmeshed with a gear 23 freely revoluble on the staff 18, this constituting a speed reducing train, and the gear 23 is provided with a post 24 smooth for a portion of its height and screw threaded at its upper end to receive a thumb-nut 25, said post having a shoulder formed thereon slightly above the top of the casing 8 through which said post extends. Independently mounted upon the post 24 are two superimposed segmental plates 26 and 27, of which the latter is the larger, each of which is provided with a scale on the upper face thereof adjacent the segmental edge thereof, and both of which are adapted to be locked against movement between the thumb-nut 25 and the shoulder on the post 24; these plates are, however, independently adjustable with respect to each other and to the post when the thumb-nut is loosened.

Carried in suitable supports 28 adjacent one side of the casing, and at the top thereof, is a shaft or rod 29, the outer end of which is provided with a crank 30 in loose connection with the lower end of the link 14, and the inner end of which is rotatable in the hub 31 of a ratchet wheel 32 rotatable in one of the supports 28, Fig. 6, by means of a button 33 and held against movement in one direction by means of a spring pawl 34, Fig. 5. A coil spring 35 has one end secured to the hub 31 and its other end to the rod 29 about which it is coiled, as is clearly shown in Fig. 1; a pin 36 is securely held in the rod 29 and provides two arms 37 and 38 of unequal lengths, the latter being the longer and, as shown in Fig. 4, I provide a movable stop 39 in the path of the arm 38 to render the device inoperative until arrangements preliminary to an exposure have been completed.

In practice, with the device in operative connection with the camera, the clock-work may be wound by the key 17 and held against movement by means of the lock 19; the button 33 may now be turned to put the spring 35 under tension, the rod 29 being prevented from rotation by said spring because of the stop 39.

When the camera is focused and all the preliminaries arranged with any persons who are to be in the picture in place with the exception of the operator, the latter loosens the thumb-nut 25 and revolves the larger plate 27 to bring a desired point of the scale thereon directly beneath the shorter arm 37, at this time in slightly elevated position due to the fact that the longer arm 38 is engaged beneath the stop 39; numerals are employed on this scale and, if the operator desires ten seconds after releasing his device before shutter operation, he sets the plate 27 with the numeral 10 beneath the arm 37. He next revolves the plate 26 to bring the desired numeral thereon in line with the end 40 of the larger plate 27 and, when the plates are so adjusted, the thumb-nut 25 is tightened and the device is ready, the numeral on the plate 26 indicating the number of seconds for the contemplated exposure.

In the use of my device, the camera shutter is set on "bulb", which requires that the release lever 12 shall be held down until the period of exposure has passed, after which it is permitted to rise to its normal position. Everything being ready, the operator moves the stop 39 to permit the shorter arm 37 to bear upon the plate 27, and then opens the lock 19 which permits the start of the clock mechanism. As the latter operates the staff 18 rotates and, thus, the gear 23 revolves to move the plates 26 and 27 therewith until the end 40 passes beneath the shorter arm 37 and clears the same, thereby permitting the rod 29 to rotate through approximately 180 degrees of a circle to cause the longer arm 38 to strike against the plate 26 in line with the numeral 5 thereon with the parts in the adjusted positions shown. Further rotation of the staff 18 and revolution of the plates 26 and 27 now continues until the longer arm 38 is cleared by the end of the segmental portion of the plate 26, thereby again permitting the rod 29 to rotate through another 180 degrees of a circle to be again engaged by the stop 39 to hold the parts in initial position as regards the rod 29 and its connections. In the release of the shorter arm 37 and first partial rotation of the rod 29, the crank 30 was carried from normal raised position to lowermost position, thereby drawing down the shutter release lever 12 and opening the shutter. The shutter was held in this open condition until the longer arm 38 cleared the plate 26 to permit the second partial rotation of the rod 29 which carried the release lever 12 back to initial position, to close the shutter. The operator may now return to the camera and stop the clock work, ready for another exposure, the adjusted plates 26 and 27 remaining as they were or readjusted if light conditions have changed, or the operator desires more or less time to reach his desired place in the picture.

The device is very simple, highly efficient, readily installed or removed, and requires no involved instructions as to the operation; the mechanism is not likely to get out of order to require repair, and the device as a whole is comparatively inexpensive.

While I have shown and described certain structural details, it will be obvious that I am not limited thereto but may make changes thereover, within the scope of the following claims, without departing from the spirit of my invention or sacrificing its advantages.

If it is desired to make instantaneous exposures the plate 26 will not project beyond the plate 27, but a desired period may be permitted for the operator to take his place in the field of the camera by the adjustment of the plate 27, if desired, or the plates 26 and 27 may be moved entirely out of the paths of the arms 37 and 38 whereby, when the stop 39 is moved backwardly, the rod will be rotated and the shutter lever depressed to actuate the shutter, no time being allowed in this arrangement for the operator to get into the picture.

Having fully described my invention, what I claim as new, and desire to secure by Letters Patent, is:—

1. An attachment for a camera, comprising a casing, a crank-rod, means for rotating said rod in one direction, means for locking said rod against such rotation and a clock mechanism for releasing said locking means, said crank-rod being adapted for connection with the operating lever of the camera shutter.

2. An attachment for a camera, comprising a casing, a crank-rod, means for rotating said rod in one direction, means for locking said rod against such rotation and a clock mechanism for actuating said locking means to permit a partial rotation of said rod at a predetermined moment, and to permit a further rotation of said rod at a predetermined interval after said first partial rotation, said crank-rod being adapted for connection with the operating lever of the camera shutter.

3. An attachment for a camera, comprising a casing, a crank-rod, means for rotating said rod in one direction, a clock mechanism, a scale bearing plate operatively connected with said clock mechanism, an arm on said rod adapted to bear on said plate to prevent rod rotation while said plate is beneath said arm, said crank-rod being adapted for connection with the operating lever of the camera shutter.

4. An attachment for a camera, comprising a casing, a crank-rod, means for rotating said rod in one direction, two arms of unequal lengths carried by said rod, a clock mechanism, two scale bearing plates adjustable with respect to each other operatively connected with said clock mechanism and of unequal sizes, the shorter of said arms being adapted to bear upon the larger of said plates when said plate is in position thereunder and the longer of said arms being adapted to bear on the smaller of said plates when the shorter arm is released by the larger plate passing from thereunder to permit a partial rotation of said rod, and the longer of said arms escaping from the smaller of said plates when the latter moves from thereunder to permit a further rotation of said rod, said rod being adapted for connection with the operating lever of the camera shutter.

In testimony whereof I have signed my name to this specification in the presence of two subscribing witnesses.

ROBERT H. McCARTNEY.

Witnesses:
MICHAEL J. KENNEDY,
WILLIAM T. ROSE.

Copies of this patent may be obtained for five cents each, by addressing the "Commissioner of Patents, Washington, D. C."